(12) United States Patent
Komatsu

(10) Patent No.: US 11,098,173 B2
(45) Date of Patent: Aug. 24, 2021

(54) PREPREG, PREPREG LAMINATE AND METHOD FOR PRODUCING PREPREG

(71) Applicant: Sumitomo Chemical Company, Limited, Tokyo (JP)

(72) Inventor: Shintaro Komatsu, Tsukuba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 16/319,942

(22) PCT Filed: Jul. 26, 2017

(86) PCT No.: PCT/JP2017/026992
§ 371 (c)(1),
(2) Date: Jan. 23, 2019

(87) PCT Pub. No.: WO2018/021389
PCT Pub. Date: Feb. 1, 2018

(65) Prior Publication Data
US 2019/0241711 A1 Aug. 8, 2019

(30) Foreign Application Priority Data
Jul. 27, 2016 (JP) .............................. JP2016-147332

(51) Int. Cl.
*C08J 5/24* (2006.01)
*C08G 63/60* (2006.01)
*C08J 5/04* (2006.01)

(52) U.S. Cl.
CPC .............. *C08J 5/24* (2013.01); *C08G 63/605* (2013.01); *C08J 5/04* (2013.01); *C08G 2250/00* (2013.01); *C08J 2367/04* (2013.01)

(58) Field of Classification Search
CPC .................................. C08J 5/24; C08G 63/60
USPC ........................................................... 524/605
See application file for complete search history.

(56) References Cited

U.S. PATENT DOCUMENTS

| | | | |
|---|---|---|---|
| 4,540,737 A | 9/1985 | Wissbrun et al. | |
| 4,588,538 A | 5/1986 | Chung et al. | |
| 5,238,638 A * | 8/1993 | Isayev ................... | B32B 7/02 264/257 |
| 2007/0092709 A1 | 4/2007 | Okamoto et al. | |
| 2011/0229629 A1 | 9/2011 | Ito et al. | |
| 2012/0135218 A1 | 5/2012 | Shim et al. | |
| 2016/0194468 A1 | 7/2016 | Ogasawara et al. | |

FOREIGN PATENT DOCUMENTS

| | | | | |
|---|---|---|---|---|
| CN | 105492510 A | 4/2016 | | |
| EP | 2335920 A1 * | 6/2011 | ............... | B32B 7/02 |
| JP | 59-176020 A | 10/1984 | | |
| JP | 62-055131 A | 3/1987 | | |
| JP | 09-309150 A | 12/1997 | | |
| JP | 2004-509190 A | 3/2004 | | |
| JP | 2007-146139 A | 6/2007 | | |
| JP | 2010-528149 A | 8/2010 | | |
| JP | 2011-190382 A | 9/2011 | | |
| JP | 2012-116906 A | 6/2012 | | |
| JP | 2013-203941 A | 10/2013 | | |
| JP | 2015-189896 A | 11/2015 | | |
| JP | 2015-206012 A | 11/2015 | | |
| JP | 5826411 B2 | 12/2015 | | |
| WO | 02/22706 A1 | 3/2002 | | |
| WO | 2008/143455 A1 | 11/2008 | | |
| WO | 2011/163365 A2 | 12/2011 | | |
| WO | 2014/087842 A1 | 6/2014 | | |
| WO | WO-2014162873 A1 * | 10/2014 | ............... | B32B 5/26 |

OTHER PUBLICATIONS

Mitsubishi Rayon CFRTP property sheet, no date available, 1 page.
Int'l Search Report dated Sep. 5, 2017 in Int'l Application No. PCT/JP2017/026992.
Chung et al., "Thermotropic Polyester Amide-Carbon Fiber Composites," Journal of Applied Polymer Science, vol. 31, pp. 965-977 (1986).
Chung, "Liquid Crystal Polyester-Carbon Fiber Composites," NASA Contractor Report 172323, pp. 1-58 (1984).
Extended European Search Report dated Jan. 21, 2020 in EP Application No. 17834391.9.
Office Action dated Jan. 5, 2021 in CN Application No. 201780045732.4.
Office Action dated Dec. 17, 2020 in TW Application No. 106125330.
Office Action dated Feb. 2, 2021 in JP Application No. 2018530342 (with English Machine Translation).
Office Action dated May 18, 2021 in TW Application No. 106125330.
Office Action dated May 31, 2021 in CN Application No. 201780045732.4.
Zhang, Y., "Handbook of Preparation of High-Tech Composite Materials," National Defense Industry Press, p. 88 (2003).

* cited by examiner

*Primary Examiner* — Deve V Hall
(74) *Attorney, Agent, or Firm* — Panitch Schwarze Belisario & Nadel LLP

(57) ABSTRACT

The present invention relates to a prepreg which contains an oriented liquid crystal polymer and a base that uses a continuous carbon fiber bundle as a forming material. The liquid crystal polymer is a thermotropic liquid crystal polymer and the base is included in an amount of at least 25 parts by mass but not more than 550 parts by mass per 100 parts by mass of the liquid crystal polymer.

6 Claims, No Drawings

PREPREG, PREPREG LAMINATE AND METHOD FOR PRODUCING PREPREG

CROSS-REFERENCE TO RELATED APPLICATIONS

This application is a Section 371 of International Application No. PCT/JP2017/026992, filed Jul. 26, 2017, which was published in the Japanese language on Feb. 1, 2018 under International Publication No. WO 2018/021389 A1, which claims priority under 35 U.S.C. § 119(b) to Japanese Application No. 2016-147332, filed on Jul. 27, 2016, the disclosures of which are incorporated herein by reference in their entireties.

TECHNICAL FIELD

The present invention relates to a prepreg, a prepreg laminate and a method for producing a prepreg.

BACKGROUND ART

Carbon-fiber-reinforced plastic (also called CFRP), which uses a thermosetting resin such as an epoxy resin, an unsaturated polyester resin or a bismaleimide resin as a matrix, is lightweight and has excellent specific strength and specific modulus. Accordingly, CFRP having a thermosetting resin as a matrix is used in aerospace applications, automobile applications, sports applications and general industrial applications.

CFRP that uses a thermosetting resin as a matrix has excellent mechanical properties. However, when used in the form of a prepreg, low-temperature storage is sometimes necessary to suppress the curing reaction. Further, another technical problems that occurs is that either the formability into a product shape is poor, or the molding time required to ensure complete curing is long.

Accordingly, in recent years, investigations have been conducted into prepregs that use carbon-fiber-reinforced thermoplastic (also called CFRTP), which exhibits excellent workability, is capable of shortening the molding cycle, and uses a thermoplastic resin that does not require low-temperature storage as the matrix (for example, see Patent Document 1).

PRIOR ART LITERATURE

Patent Document

Patent Document 1: JP 2013-203941 A

SUMMARY OF INVENTION

Problems to be Solved by the Invention

However, the prepreg having a thermoplastic resin as a matrix disclosed in Patent Document 1 has insufficient mechanical strength. Accordingly, further improvements are required in the mechanical strength of prepregs that use a thermoplastic resin as a matrix.

The present invention has been developed in light of these circumstances, and has an object of providing a prepreg and a prepreg laminate which have excellent mechanical strength. Further, the invention also has an object of providing a method for producing a prepreg having excellent mechanical strength.

Means for Solving the Problems

In order to achieve the above objects, one aspect of the present invention provides a prepreg comprising an oriented liquid crystal polymer and a base that contains a continuous carbon fiber bundle.

In one aspect of the present invention, the liquid crystal polymer is preferably a thermotropic liquid crystal polymer.

In one aspect of the present invention, the base is included in an amount of at least 25 parts by mass but not more than 550 parts by mass per 100 parts by mass of the liquid crystal polymer.

One aspect of the present invention provides a prepreg laminate prepared by laminating a plurality of the prepregs described above.

One aspect of the present invention provides a method for producing the prepreg described above, the method comprising a step of superimposing a film that uses an oriented liquid crystal polymer as a forming material, and a base that uses a continuous carbon fiber bundle as a forming material and subsequently performing heating, thereby melt-impregnating the liquid crystal polymer into the base.

In other words, the present invention has the following aspects.

<1> A prepreg comprising an oriented liquid crystal polymer and a base that uses a continuous carbon fiber bundle as a forming material.
<2> The prepreg according to <1>, wherein the liquid crystal polymer is a thermotropic liquid crystal polymer.
<3> The prepreg according to <1> or <2>, comprising the base in an amount of at least 25 parts by mass but not more than 550 parts by mass per 100 parts by mass of the liquid crystal polymer.
<4> A prepreg laminate prepared by laminating a plurality of the prepreg according to any one of <1> to <3>.
<5> A method for producing the prepreg according to any one of <1> to <3>, the method comprising a step of superimposing a film that uses an oriented liquid crystal polymer as a forming material, and a base that uses a continuous carbon fiber bundle as a forming material, and subsequently performing heating, thereby melt-impregnating the liquid crystal polymer into the base.

Effects of the Invention

Aspects of the present invention provide a prepreg and a prepreg laminate which have excellent mechanical strength. Further, a method for producing the prepreg having excellent mechanical strength is also provided.

EMBODIMENTS FOR CARRYING OUT THE INVENTION

<Prepreg>

A prepreg of an embodiment of the present invention comprises an oriented liquid crystal polymer, and a base that uses a continuous carbon fiber bundle as a forming material.

[Liquid Crystal Polymer]

The prepreg of the present embodiment comprises a liquid crystal polymer as a matrix resin (matrix). The liquid crystal polymer in this embodiment refers to a polymer which exhibits optical anisotropy upon melting, and has a temperature region in which an anisotropic melt phase is formed. The anisotropic melt phase can be confirmed by a conventional polarization inspection method using crossed polarizers. More specifically, confirmation of the anisotropic melt phase can be performed using a polarizing microscope, by placing the molten sample on a hot stage, and observing the sample while the temperature of the hot stage is raised under a nitrogen atmosphere. For example, when inspected between crossed polarizers, the liquid crystal polymer of the present embodiment sometimes transmits polarized light even in a molten static state, indicating optical anisotropy.

The type of liquid crystal polymer used in the present embodiment is, for example, preferably a thermotropic liquid crystal polymer. In this description, a "thermotropic liquid crystal polymer" represents a concept used to differentiate from lyotropic liquid crystals, and means a polymer compound that exhibits liquid crystallinity within a certain temperature range. The thermotropic liquid crystal polymer is, for example, preferably a liquid crystal aromatic polyester resin (hereinafter sometimes referred to as an "aromatic polyester") or a liquid crystal aromatic polyesteramide resin (hereinafter sometimes referred to as an "aromatic polyesteramide") that forms an anisotropic melt phase. Further, the liquid crystal polymer may also be a polyester that partially incorporates an aromatic polyester or an aromatic polyesteramide within the same molecular chain.

Cases are described below in which an aromatic polyester or an aromatic polyesteramide is used as one example of the liquid crystal polymer used in the present embodiment.

The aromatic polyester or aromatic polyesteramide preferably has a structural unit derived from at least one compound selected from the group consisting of aromatic hydroxycarboxylic acids, aromatic hydroxyamines and aromatic diamines. In this description, "derived from" means a change in the chemical structure due to polymerization of the compound such as the aforementioned aromatic hydroxycarboxylic acid, aromatic hydroxyamine or aromatic diamine.

In those cases where the liquid crystal polymer of the present embodiment is an aromatic polyester, the polymer preferably has a repeating unit represented by formula (1) shown below (hereinafter sometimes referred to as "the repeating unit (1)"), and more preferably has the repeating unit (1), a repeating unit represented by formula (2) shown below (hereinafter sometimes referred to as "the repeating unit (2)"), and a repeating unit represented by formula (3) shown below (hereinafter sometimes referred to as "the repeating unit (3)").

   (1)

   (2)

   (3)

(In formulas (1) to (3), $Ar^1$ represents a phenylene group, a naphthylene group, or a biphenylylene group. Each of $Ar^2$ and $Ar^1$ independently represents a phenylene group, a naphthylene group, a biphenylylene group, or a group represented by formula (4) shown below. Each of X and Y independently represents an oxygen atom or an imino group (—NH—). Hydrogen atoms in the group represented by $Ar^1$, $Ar^2$ or $Ar^3$ may each be independently substituted with a halogen atom, an alkyl group or an aryl group.)

   (4)

(Each of $Ar^4$ and $Ar^5$ independently represents a phenylene group or a naphthylene group. Z represents an oxygen atom, sulfur atom, carbonyl group, sulfonyl group or alkylidene group.)

Examples of the halogen atom that may substitute a hydrogen atom in the group represented by $Ar^1$, $Ar^2$ or $Ar^1$ include a fluorine atom, chlorine atom, bromine atom and iodine atom.

The alkyl group that may substitute a hydrogen atom in the group represented by $Ar^1$, $Ar^2$ or $Ar^3$ preferably has 1 to 10 carbon atoms. Examples of the alkyl group include a methyl group, ethyl group, n-propyl group, isopropyl group, n-butyl group, isobutyl group, s-butyl group, t-butyl group, n-hexyl group, n-heptyl group, 2-ethylhexyl group, n-octyl group, nonyl group and n-decyl group.

The aryl group that may substitute a hydrogen atom in the group represented by $Ar^1$, $Ar^2$ or $Ar^3$ preferably has 6 to 20 carbon atoms. Examples of the aryl group include monocyclic aromatic groups such as a phenyl group, o-tolyl group, m-tolyl group and p-tolyl group, and condensed-ring aromatic groups such as a 1-naphthyl group and 2-naphthyl group.

In those cases where a hydrogen atom in the group represented by $Ar^1$, $Ar^2$ or $Ar^3$ is substituted by one of the above groups, the number of the substituent groups in each group represented by $Ar^1$, $Ar^2$ or $Ar^3$ is, independently, preferably one or two, and is more preferably one.

The alkylidene group mentioned above preferably has 1 to 10 carbon atoms. Examples of the alkylidene group include a methylene group, ethylidene group, isopropylidene group, n-butylidene group and 2-ethylhexylidene group.

The repeating unit (1) is a repeating unit derived from an aromatic hydroxycarboxylic acid. The repeating unit (1) is preferably a repeating unit in which $Ar^1$ is a p-phenylene group (a repeating unit derived from p-hydroxybenzoic acid) or a repeating unit in which $Ar^1$ is a 2,6-naphthylene group (a repeating unit derived from 6-hydroxy-2-naphthoic acid).

The repeating unit (2) is a repeating unit derived from an aromatic dicarboxylic acid. The repeating unit (2) is preferably a repeating unit in which $Ar^2$ is a p-phenylene group (a repeating unit derived from terephthalic acid), a repeating unit in which $Ar^1$ is an m-phenylene group (a repeating unit derived from isophthalic acid), a repeating unit in which $Ar^2$ is a 2,6-naphthylene group (a repeating unit derived from 2,6-naphthalenedicarboxylic acid) or a repeating unit in which $Ar^2$ is a diphenyl ether-4,4'-diyl group (a repeating unit derived from diphenyl ether-4,4'-dicarboxylic acid), and a repeating unit in which $Ar^2$ is a p-phenylene group or a repeating unit in which $Ar^2$ is a m-phenylene group is more preferable.

The repeating unit (3) is a repeating unit derived from an aromatic diol, an aromatic hydroxyamine or an aromatic diamine. The repeating unit (3) is preferably a repeating unit in which $Ar^3$ is a p-phenylene group (a repeating unit derived from hydroquinone, p-aminophenol or p-phenylenediamine), or a repeating unit in which $Ar^3$ is a 4,4'-biphenylylene group (a repeating unit derived from 4,4'-dihydroxybiphenyl, 4-amino-4'-hydroxybiphenyl or 4,4'-diaminobiphenyl).

The amount of the repeating unit (1), relative to the total number of moles of the repeating unit (1), the repeating unit (2) and the repeating unit (3), is preferably at least 30 mol %, more preferably at least 30 mol % but not more than 80 mol %, even more preferably at least 40 mol % but not more than 70 mol %, and particularly preferably at least 45 mol % but not more than 65 mol %.

The amount of the repeating unit (2), relative to the total number of moles of the repeating unit (I), the repeating unit (2) and the repeating unit (3), is preferably not more than 35 mol %, more preferably at least 10 mol % but not more than 35 mol %, even more preferably at least 15 mol % but not more than 30 mol %, and particularly preferably at least 17.5 mol % but not more than 27.5 mol %.

The amount of the repeating unit (3), relative to the total number of moles of the repeating unit (1), the repeating unit (2) and the repeating unit (3), is preferably not more than 35 mol %, more preferably at least 10 mol % but not more than 35 mol %, even more preferably at least 15 mol % but not more than 30 mol %, and particularly preferably at least 17.5 mol % but not more than 27.5 mol %.

In other words, the aromatic polyester is preferably a compound in which, relative to the total number of moles of the repeating unit (1), the repeating unit (2) and the repeating unit (3), the amount of the repeating unit (1) is at least 30 mol % but not more than 80 mol %, the amount of the repeating unit (2) is at least 10 mol % but not more than 35 mol %, and the amount of the repeating unit (3) is at least 10 mol % but not more than 35 mol %. In the present embodiment, the sum of the amount of the repeating unit (1), the amount of the repeating unit (2) and the amount of the repeating unit (3) relative to the total number of moles of the repeating unit (1), the repeating unit (2) and the repeating unit (3) does not exceed 100 mol %.

The larger the amount of the repeating unit (1) in the aromatic polyester, the more easily the melt fluidity, the heat resistance, and the strength and rigidity can be improved, but if the amount is too large, then the melting temperature and the melt viscosity tend to increase, and the temperature required for molding tends to increase.

The ratio between the amount of the repeating unit (2) and the amount of the repeating unit (3) is represented by [amount of repeating unit (2)]/[amount of repeating unit (3)] (mol/mol), and is preferably from 0.9/1 to 1/0.9, more preferably from 0.95/1 to 1/0.95, and even more preferably from 0.98/1 to 1/0.98.

Moreover, in the aromatic polyester used in the present embodiment, the amount of repeating units containing a 2,6-naphthylene group relative to the total number of moles of all the repeating units is preferably at least 0 mol % but less than 40 mol %. Here, the total number of moles of all the repeating units indicates the value obtained by determining the substance equivalent amount (mol) of each repeating unit in the aromatic polyester by dividing the total mass of the repeating unit by the formula weight of the repeating unit, and then totaling all the substance equivalent amounts.

The aromatic polyester used in the present embodiment may have two or more types of each of the repeating units (1) to (3). Further, the aromatic polyester may also have one or more other repeating units besides the repeating units (1) to (3), but the amount of those other repeating units relative to the total number of moles of all the repeating units is preferably greater than 0 mol % but not more than 10 mol %, and is more preferably greater than 0 mol % but not more than 5 mol %. In a separate aspect of the present embodiment, the aromatic polyester preferably does not contain any other repeating units besides the repeating units (1) to (3).

The aromatic polyester used in the present embodiment preferably has a repeating unit in which X and Y both represent oxygen atoms as the repeating unit (3), namely a repeating unit derived from an aromatic diol described below, as this tends to facilitate a reduction in the melt viscosity, and it is more preferable that the aromatic polyester has only units in which X and Y both represent oxygen atoms as the repeating unit (3).

Specific examples of the aromatic polyester and the aromatic polyesteramide include compounds described below in (S1) to (S4).
(S1) Polyesters composed mainly of one, or two or more, aromatic hydroxycarboxylic acids or derivatives thereof.
(S2) Polyesters composed mainly of (a) one, or two or more, aromatic hydroxycarboxylic acids or derivatives thereof, (b) one, or two or more, aromatic dicarboxylic acids, alicyclic dicarboxylic acids, or derivatives thereof, and (c) at least one, or two or more, aromatic diols, alicyclic diols, aliphatic diols, or derivatives thereof.
(S3) Polyesteramides composed mainly of (a) one, or two or more aromatic hydroxycarboxylic acids or derivatives thereof, (b) one, or two or more, aromatic hydroxyamines, aromatic diamines, or derivatives thereof, and (c) one, or two or more aromatic dicarboxylic acids, alicyclic dicarboxylic acids, or derivatives thereof.
(S4) Polyesteramides composed mainly of (a) one, or two or more aromatic hydroxycarboxylic acids or derivatives thereof. (b) one, or two or more, aromatic hydroxyamines, aromatic diamines, or derivatives thereof, (c) one, or two or more aromatic dicarboxylic acids, alicyclic dicarboxylic acids, or derivatives thereof, and (d) at least one, or two or more, aromatic diols, alicyclic diols, aliphatic diols, or derivatives thereof.

Moreover, a molecular weight regulator may also be added to the above monomer or monomer mixture.

Preferred examples of the aromatic hydroxycarboxylic acids that yield repeating units of these polymers (aromatic polyesters and polyesteramides) include p-hydroxybenzoic acid, m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, as well as alkyl-substituted, alkoxy-substituted and halogen-substituted derivatives of these compounds, and ester-forming derivatives of these compounds such as acylated products, ester derivatives and acid halide derivatives. Among these, p-hydroxybenzoic acid and 6-hydroxy-2-naphthoic acid are preferable in terms of ease of adjustment of the properties and melting point of the obtained liquid crystal polymer.

Examples of the aromatic diols include aromatic diols such as 2,6-dihydroxynaphthalene, 1,4-dihydroxynaphthalene, 4,4'-dihydroxybiphenyl, hydroquinone, resorcin, 2,7-dihydroxynaphthalene, 1,6-dihydroxynaphthalene, 3,3'-dihydroxybiphenyl, 3,4'-dihydroxybiphenyl and 4,4'-dihydroxybiphenyl ether, as well as alkyl-substituted, alkoxy-substituted and halogen-substituted derivatives of these compounds, ester-forming derivatives of these compounds such as acylated products, compounds represented by general formula (I) shown below, and compounds represented by general formula (II) shown below. Among these, hydroquinone and 4,4'-dihydroxybiphenyl are preferable in terms of the reactivity during polymerization and the properties of the obtained liquid crystal polymer.

Similarly, preferred examples of the aromatic dicarboxylic acids include aromatic dicarboxylic acids such as terephthalic acid, isophthalic acid, 4,4'-diphenyldicarboxylic acid, 2,6-naphthalenedicarboxylic acid, 1,6-naphthalenedicarboxylic acid, 2,7-naphthalenedicarboxylic acid, 1,4-naphthalenedicarboxylic acid and 4,4'-dicarboxybiphenyl, as well as alkyl-substituted, alkoxy-substituted and halogen-substituted derivatives of these compounds, ester-forming derivatives of these compounds such as ester derivatives and acid halide derivatives, and compounds represented by general formula (III) shown below. Among these, terephthalic acid, isophthalic acid and 2,6-naphthalenedicarboxylic acid are preferable in terms of ease of adjustment of the mechanical properties, heat resistance, melting point temperature and moldability of the obtained liquid crystal polymer to appropriate levels.

Similarly, preferred examples of the aromatic hydroxyamines include aromatic hydroxyamines such as p-aminophenol, m-aminophenol, 4-amino-1-naphthol, 5-amino-1-naphthol, 8-amino-2-naphthol, 4-amino-4'-hydroxybiphenyl, as well as alkyl-substituted, alkoxy-substituted and halogen-substituted derivatives of these compounds, and ester-forming or amide-forming derivatives of these compounds such as acylated products.

Specific examples of the aromatic diamines include aromatic diamines such as p-phenylenediamine, m-phenylenediamine, 1,5-diaminonaphthalene and 1,8-diaminonaphthalene, as well as alkyl-substituted, alkoxy-substituted and halogen-substituted derivatives of these compounds, and amide-forming derivatives of these compounds such as acylated products.

Similarly, preferred examples of the alicyclic dicarboxylic acid include dicarboxylic acids of 8 to 12 carbon atoms (C8 to C12) such as hexahydrophthalic acid, hexahydroisophthalic acid, hexahydroterephthalic acid, cyclohexanedicarboxylic acid, decalindicarboxylic acid and tetralindicarboxylic acid, as well as reactive derivatives of these compounds (for example, ester-forming derivatives such as lower alkyl esters, acid chlorides and acid anhydrides). An example of an acid anhydride is himic anhydride.

Similarly, preferred examples of the alicyclic diols include cyclohexanedimethanol, adamantanediol, spiroglycol and tricyclodecanedimethanol.

Similarly, preferred examples of the aliphatic diols include ethylene glycol, propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, and derivatives of these compounds.

[Chemical formula 1]

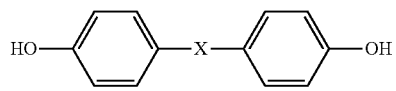
(I)

(In formula (I), X represents a functional group selected from among alkylene groups of 1 to 4 carbon atoms, alkylidene groups of 1 to 4 carbon atoms, an oxygen atom, a sulfinyl group (—SO—), a sulfonyl group (—SO$_2$—), a sulfide group (—S—) and a carbonyl group (—CO—).)

[Chemical formula 2]

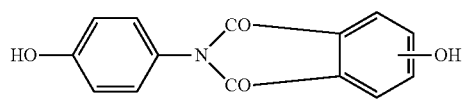
(II)

[Chemical formula 3]

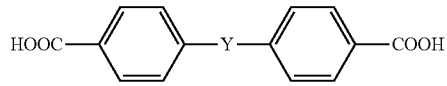
(III)

(In formula (III). Y represents a functional group selected from among alkylene groups of 1 to 4 carbon atoms and groups represented by —O(CH$_2$)$_n$O— (wherein n represents an integer of 1 to 4).)

The aromatic polyester or aromatic polyesteramide is polymerized using a direct polymerization method or transesterification method, and during the polymerization, a melt polymerization method or a slurry polymerization method or the like is used. A monomer having an ester-forming function may be used, as is, in the polymerization. Further, a compound that is converted from a precursor to a derivative having an ester-forming function in a step prior to the polymerization may also be used in the polymerization.

A variety of catalysts may be used during the polymerization. Examples of the catalyst include metal compounds such as magnesium acetate, stannous acetate, tetrabutyl titanate, lead acetate, sodium acetate, potassium acetate and antimony trioxide, and nitrogen-containing heterocyclic compounds such as N,N-dimethylaminopyridine and N-methylimidazole, and nitrogen-containing heterocyclic compounds are preferable.

The amount used of the catalyst, relative to the total mass of the monomer, is preferably at least 0.001.% by mass but not more than 1% by mass, and more preferably at least 0.01% by mass but not more than 0.2% by mass.

The polymer produced by the polymerization described above may, if necessary, by subjected to an additional solid-phase polymerization by heating under reduced pressure or within an inert gas atmosphere to increase the molecular weight.

The flow starting temperature of the liquid crystal polymer according to the present embodiment is preferably at least 270° C., more preferably at least 270° C. but not more than 400° C., and even more preferably at least 280° C. but not more than 380° C.

The higher the flow starting temperature of the liquid crystal polymer according to the present embodiment, the more easily the heat resistance and the strength and rigidity can be improved, but if the flow starting temperature is too high, then a high temperature is required to melt the polymer, thermal degradation during molding becomes more likely, and the viscosity upon melting tends to increase, causing a deterioration in fluidity.

The flow starting temperature is also called the flow temperature or the fluidization temperature, and is the temperature that yields a viscosity of 4,800 Pa s (48,000 poise) when the liquid crystal polymer is melted by heating at a rate of temperature increase of 4° C./minute under a load of 9.8 MPa (100 kgf/cm$^2$) using a capillary rheometer, and extruded from a nozzle having an inner diameter of 1 mm and a length of 10 mm, and is a temperature that acts as a measure of the molecular weight of the liquid crystal polymer (see Naoyuki Koide (ed.), "Liquid Crystal Polymers—Synthesis, Molding, Applications—", CMC Publishing Co., Ltd., Jun. 5, 1987, p. 95).

There are no particular limitations on the melt viscosity of the liquid crystal polymer used in the present embodiment, but when measured at a temperature 30° C. higher than the flow starting temperature, using a capillary with a diameter of 0.5 mm and a length of 10 mm, at a shear rate of 1,000 s$^{-1}$, the melt viscosity is preferably at least 10 Pa·s but not more than 600 Pa-s. Provided the melt viscosity of the liquid crystal polymer falls within the above range, the liquid crystal polymer has a level of fluidity that is suitable for molding. The melt viscosity of the liquid crystal polymer can be measured, for example, using a Capilograph (manufactured by Toyo Seiki Seisaku-sho, Ltd.).

There are no particular limitations on the melt tension of the liquid crystal polymer used in the present embodiment, but when measured at a temperature 30° C. higher than the flow starting temperature, using a capillary with a diameter of 0.5 mm and a length of 10 mm, at a drawing speed of 42 m/minute, the melt tension is preferably at least 1 mN but not more than 20 mN. Provided the melt tension of the liquid crystal polymer falls within the above range, a film that is suitable for prepreg production can be more easily obtained, and superior mechanical properties are more easily obtained for the prepreg. The surface tension of the liquid crystal polymer can be measured, for example, using a Capilograph (manufactured by Toyo Seiki Seisaku-sho, Ltd.).

A single liquid crystal polymer of the present embodiment may be used alone, or a combination of two or more polymers may be used.

In the prepreg of the present embodiment, the molecular chains of the liquid crystal polymer are oriented. The direction of this molecular chain orientation may be either uniaxial orientation or biaxial orientation. The liquid crystal polymer is preferably oriented along a single direction. There are no particular limitations on the shape of the prepreg, and for example, a roll-like shape or a substantially rectangular solid shape that appears rectangular when viewed in plan view may be formed depending on the application. In the following description, among the three mutually orthogonal directions of the roll-like shape and the substantially rectangular solid shape, the direction having the shortest dimension is deemed the thickness direction of the prepreg, the direction having the second shortest dimension is termed the width direction of the prepreg, and the direction having the longest dimension is termed the longitudinal direction of the prepreg.

In those cases where the prepreg has a roll-like shape, a prepreg of an arbitrary length can be cut, for example, from a roll having an aforementioned prepreg thickness direction dimension of 0.05 to 1 mm, a prepreg width direction dimension of 5 to 600 mm, and a prepreg longitudinal direction dimension of 1,000 m.

In those cases where the prepreg has a substantially rectangular solid shape, the prepreg may, for example, have an aforementioned prepreg thickness direction dimension of 0.05 to 1 mm, a prepreg width direction dimension of 5 to 600 mm, and a prepreg longitudinal direction dimension of 5 to 600 mm.

The longitudinal direction dimension and the width direction dimension of the prepreg can be obtained, for example, by performing measurements at three points using a laser displacement meter, and then calculating the average of those values. The thickness direction dimension of the prepreg can be obtained, for example, by performing measurements at 5 locations using a micrometer, and then calculating the average of those values.

Further, the liquid crystal polymer is preferably oriented along the longitudinal direction or the width direction of the prepreg.

The degree of orientation of the liquid crystal polymer can be obtained by irradiating microwaves onto a sample (liquid crystal polymer film) positioned at arbitrary angles, and measuring the intensity of the microwaves transmitted through the sample. In other words, the interaction between a microwave electric field having a fixed frequency and the dipoles that constitute the polymer substance correlates with the inner product of the two vectors. Because of the anisotropy of the permittivity of the sample, the intensity of the microwaves varies depending on the angle at which the sample is disposed, and as a result, the degree of orientation can be ascertained.

Although there are no particular limitations on the microwaves used for the measurements, examples include 4 GHz or 12 GHz or the like. An example of a measurement device that applies these types of principles is a molecular orientation analyzer MOA-5012A (manufactured by Oji Scientific Instruments Co., Ltd.). The degree of alignment obtained by measuring the liquid crystal polymer film with a molecular orientation analyzer is expressed as MOR (degree of orientation in film drawing direction/degree of orientation in direction perpendicular to drawing direction and thickness direction).

Furthermore, the degree of orientation can also be measured using an X-ray diffraction method or by infrared dichroism measurements.

The degree of orientation of the liquid crystal polymer film measured by X-ray diffraction is expressed as a molecular chain degree of orientation (%). The molecular chain degree of orientation (%) of the liquid crystal polymer contained in a liquid crystal polymer film or a prepreg can be calculated using the following formula, using the peak intensity half-value width x ° (the peak width at the position at half the height of the peak) obtained from the intensity profile for azimuthal angle directions from 0° to 180° C. in the Debye ring diffraction peak (the diffraction peak that appears in the vicinity of a diffraction angle $2\theta=19.8°$) obtained by performing wide-angle X-ray diffraction measurements.

In embodiments of the present invention, "oriented" refers, for example, to a degree of orientation of 10% or greater in the following formula.

$$\text{Degree of orientation (\%)} = \frac{(180-x)}{180} \times 100 \quad \text{[Numerical formula 1]}$$

In measurements of the liquid crystal polymer film using X-ray diffraction, the larger the proportion of liquid crystal polymer molecular chains oriented in one direction among all of the molecular chains within the liquid crystal polymer film, the larger the molecular chain degree of orientation becomes.

[Base]

As mentioned above, the base of the present embodiment has a continuous carbon fiber bundle.

The amount of carbon fiber relative to the total mass of the bass is preferably from 90 to 100% by mass, more preferably from 95 to 100% by mass, and even more preferably from 98 to 100% by mass.

In the present invention, "carbon fiber" means fiber in which, of the total mass of fiber obtained by subjecting an organic fiber precursor to a heated carbonization treatment, a mass ratio of at least 90% is composed of carbon.

A continuous carbon fiber bundle describes a plurality of continuous carbon fibers that have been bundled together. Continuous carbon fibers refer to carbon fibers having a fixed length.

There are no particular limitations on the number of strands of fiber in the bundled plurality of continuous carbon fibers, but the number is typically from 3,000 to 50,000.

There are no particular limitations on the shape of the base, and for example, a substantially rectangular solid shape that appears rectangular when viewed in plan view may be used. In the following description, among the three mutually orthogonal directions of the substantially rectangular solid shape, the direction having the shortest dimension is deemed the thickness direction of the base, the direction having the second shortest dimension is termed the width direction of the base, and the direction having the longest dimension is termed the longitudinal direction of the base.

The shape and size of the base may be selected appropriately to match the shape of the prepreg described above.

In terms of achieving superior handling properties and superior rigidity for the prepreg of the present embodiment, the fixed length mentioned above is typically at least 10 mm, preferably at least 50 mm, and more preferably 100 mm or greater.

Further, the continuous carbon fiber bundle preferably includes carbon fibers that extend continuously from one end of the base to the other end without a single break. In the present embodiment, in the case where the shape of the base is a substantially rectangular solid that appears rectangular when viewed in plan view, the expression "from one end of the base to the other end" means from one arbitrary side of the rectangle to the side opposite that arbitrary side in the plan view rectangle that is observed when viewing the base from the thickness direction. However, the carbon fibers contained in the continuous carbon fiber bundle need not necessarily be continuous across the entire base, and no particular problems arise if the carbon fibers are broken partway.

By using a carbon fiber bundle containing these types of continuous carbon fibers in the prepreg, superior mechanical properties (mechanical strength) can be realized.

The continuous carbon fiber bundle and the continuous carbon fibers contained in the carbon fiber bundle are preferably aligned in at least one direction.

The proportion of carbon fibers that extend continuously from one end of the base to the other end without a break, relative to the total mass of the continuous carbon fiber bundle, reported relative to the total mass of all the carbon fibers, is preferably at least 50% by mass, more preferably at least 70% by mass, and even more preferably 90% by mass or greater. The continuous carbon fibers are sometimes broken during formation of the base and the prepreg, and therefore it is difficult to ensure that all of the carbon fibers extend from one end of the base to the other end without a break. Accordingly, carbon fibers that have breaks between one end of the base and the other end are often included in a considerable amount.

In a separate aspect of the present invention, the proportion of carbon fibers that extend continuously from one end of the base to the other end without a break, relative to the total mass of the continuous carbon fiber bundle, reported relative to the total mass of all the carbon fibers, is preferably from 50% by mass to 100% by mass, more preferably from 70% by mass to 100% by mass, and even more preferably from 90% by mass to 100% by mass.

Whether the carbon fibers extend continuously from one end of the base to the other end can be confirmed by inspection of the base surface using a scanning electron microscope (hereinafter sometimes referred to as an "SEM") or the like.

Examples of the form of the continuous carbon fiber bundle include filaments, cloths, sheets in which the fibers are bundled in alignment along a single direction, UD (uni-directional) sheets in which the fibers are aligned along a single direction, woven sheets prepared by plain weaving or satin weaving, braided sheets in which long fiber bundles are braided together, and reinforced fibers in which braids, multifilaments or spun yarns are aligned along a single direction by drum winding or the like. Among these, from the viewpoint of the mechanical properties, UD sheets can be used particularly favorably. Further, one of these reinforced forms may be used alone, or a combination of two or more reinforced forms may be used.

In those cases where a base having intersecting carbon fiber bundles, or a base having braided carbon fiber bundles is used, a prepreg that exhibits superior mechanical strength in any arbitrary direction can be obtained.

The carbon fibers used in the continuous carbon fiber bundle of the present embodiment are typical carbon fibers obtained by firing a so-called precursor. More specifically, the precursor is first subjected to a flameproofing treatment in an oxidizing atmosphere, and the thus obtained flameproof fibers are then fired at about 800 to 2,000° C. in an inert gas atmosphere. If necessary, the product may then be fired further in an even higher inert gas atmosphere. Known carbon fibers typically have a sizing agent applied to the fiber surface.

There are no particular limitations on the type of carbon fiber, and examples include polyacrylonitrile-based fibers (hereinafter sometimes referred to as "PAN-based" fibers), petroleum or petroleum pitch-based fibers (hereinafter sometimes referred to as "pitch-based" fibers), rayon-based fibers and lignin-based fibers.

The carbon fibers that constitute the continuous carbon fiber bundle may use conventionally known carbon fibers. Examples of PAN-based carbon fibers include "TORAYCA" (a registered trademark) manufactured by Toray Industries, Inc., "PYROFIL" (a registered trademark) manufactured by Mitsubishi Rayon Co., Ltd., and "TENAX" (a registered trademark) manufactured by Toho Tenax Co., Ltd. Examples of pitch-based carbon fibers include "DIALEAD" (a registered trademark) manufactured by Mitsubishi Chemical Corporation, "DONACARBO" (a registered trademark) manufactured by Osaka Gas Chemicals Co., Ltd., and "KRECA" (a registered trademark) manufactured by Kureha Corporation.

The average diameter of the carbon fibers that constitute the continuous carbon fiber bundle is typically at least 0.1 μm but not more than 100 μm, preferably at least 0.5 μm but not more than 50 μm, more preferably at least 1 μm but not more than 30 μm, and even more preferably at least 1 μm but not more than 10 μm.

The diameter of the carbon fiber can be obtained, for example, by using SEM observation to measure the diameter of 10 carbon fibers, and then calculating the average of the measured values.

Provided the average diameter of the carbon fiber is at least 0.1 μm, impregnation by the liquid crystal polymer that is used as the matrix becomes easier. Further, provided the average diameter of the carbon fiber is not more than 100 μm, reinforcement of the liquid crystal polymer by the carbon fibers can be performed efficiently, and the strength of the obtained prepreg and the laminate thereof can be improved.

A sizing agent is usually adhered to the fired carbon fibers, after any surface treatment such as an electrolytic oxidation treatment or gas phase oxidation treatment has been performed. The sizing agent is typically composed of an organic material such as an epoxy-based polymer, a nylon-based polymer or a urethane-based polymer.

When carbon fibers are used for a prepreg, it is generally desirable that, as far as possible, the constituent fibers are aligned in a parallel and uniform manner. However, when opening the carbon fibers, satisfactory opening may sometimes be difficult to achieve in the case of carbon fibers to which a sizing agent has been adhered.

Accordingly, it is generally known that when performing opening of the carbon fibers, the amount of sizing agent is preferably reduced. When performing opening of the carbon fibers, the amount of the sizing agent relative to the total mass of the carbon fibers is preferably from 0 to 4% by mass, more preferably from 0 to 2% by mass, even more preferably from 0 to 1% by mass, and particularly preferably from 0 to 0.1% by mass.

The amount of the sizing agent adhered to the carbon fibers can be reduced using conventional methods. Examples of methods for reducing the sizing agent include a method in which the sizing agent is dissolved by continuously immersing the carbon fiber bundle in a tank filled with an organic solvent such as acetone, a method of reducing the amount of sizing agent by exposing the carbon fiber bundle to superheated steam, thereby causing water vapor to penetrate at the interface between the carbon fiber and the sizing agent, and a method of heating the carbon fiber bundle to a temperature at least as high as the decomposition temperature of the sizing agent but less than the decomposition temperature of the carbon fiber.

By subjecting the carbon fiber bundle having a reduced amount of sizing agent to an opening treatment using an opening roller, a base can be obtained using the carbon fiber bundle as a forming material. The size of the obtained base varies depending on the type of carbon fiber bundle used in the opening treatment, but for example, in the case where a carbon fiber bundle having 12,000 to 24,000 bundled carbon fibers with a fineness within a range from 400 g/1000 m to 1,100 g/1000 m is opened, the carbon fiber bundle can form a base having a width of at least 25 mm and a thickness of not more than 0.04 mm. Moreover, in the case where a carbon fiber bundle having at least 24.000 bundled carbon fibers with a fineness of at least 1.600 g/1000 m is opened, the carbon fiber bundle can form a base having a width of at least 40 mm and a thickness of not more than 0.2 mm. The size of these bases may be selected appropriately in accordance with the size of the prepreg and prepreg laminate that are to be produced.

[Prepreg]

The prepreg of the present embodiment preferably contains at least 50 parts by mass but not more than 200 parts by mass of the base, more preferably contains at least 80 parts by mass but not more than 170 parts by mass of the base, and even more preferably contains at least 100 parts by mass but not more than 150 parts by mass of the base, per 100 parts by mass of the liquid crystal polymer. Including the base in an amount within this range ensures that the obtained prepreg exhibits particularly superior mechanical strength.

Further, the volume fraction (Vf) of the continuous carbon fiber bundle relative to the total volume of the prepreg of the present embodiment is typically at least 10% but not more than 85%, preferably at least 20% but not more than 75%, and more preferably at least 30% but not more than 65%.

In this description, the volume fraction (Vf) of the continuous carbon fiber bundle relative to the total volume of the prepreg can be measured in accordance with JIS K7075: 1991.

The molecular chain degree of orientation of the liquid crystal polymer contained in the prepreg of the present embodiment is typically greater than 10%, and is preferably at least 20%, more preferably at least 30%, even more preferably at least 40%, and still more preferably 45% or greater.

In a separate aspect of the present embodiment, the molecular chain degree of orientation of the liquid crystal polymer contained in the prepreg is typically greater than 10% but not more than 90%, and is preferably at least 20% but not more than 80%, more preferably at least 30% but not more than 70%, even more preferably at least 40% but not more than 60%, and particularly preferably at least 45% but not more than 55%.

The base used in the prepreg of the present embodiment is preferably prepared by opening a continuous carbon fiber bundle after reducing the sizing agent adhered to the carbon fiber bundle. In this type of base, opening can be performed uniformly, and the base can be spread out thinly. Accordingly, the amount of liquid crystal polymer that is used to cover this type of base can be reduced compared with the case where the amount of sizing agent is not reduced.

<Method for Producing Prepreg>

Examples of the method used for producing the prepreg according to an embodiment of the present invention include a method in which the melted liquid crystal polymer is impregnated into the base using an extruder, and a method in which the liquid crystal polymer is formed as a film in an oriented state, and the film is then laminated to the base.

Of these methods, from the viewpoints of the physical properties of the liquid crystal polymer and the properties of the base, in the present embodiment, a method in which the liquid crystal polymer is formed as a film and then laminated to the base is typically used. In other words, a production method of an embodiment of the present invention has a step of superimposing a film that uses an oriented liquid crystal polymer as a forming material, and a base that uses a continuous carbon fiber bundle as a forming material, and subsequently performing heating, thereby melt-impregnating the liquid crystal polymer into the base. By first forming the liquid crystal polymer as a film, control of the state of orientation of the liquid crystal polymer contained in the resulting prepreg becomes easier. The above method is described below.

(Production of Oriented Liquid Crystal Polymer Film)

The liquid crystal polymer film that is melt-impregnated into the base in this production method may employ a commercially available film, or may be a film that is formed by a conventional method using the liquid crystal polymer. A specific method of forming the liquid crystal polymer as a film is described below.

First, the liquid crystal polymer described above, and if required any of the optional other components described above, are melt-kneaded in a twin-screw extruder and pelletized to produce pellets of the liquid crystal polymer. Next, a melted resin film (molten resin) obtained by extruding the produced pellets through a T-die is wound while applying uniaxial stretching in the direction of the winder (also referred to as the longitudinal direction or the MD). This method yields a uniaxially oriented liquid crystal polymer film (uniaxially oriented film).

Further, an example of another method is a method in which the molten resin described above is wound while applying biaxial stretching. With this method, a biaxially stretched (oriented) film is obtained.

Moreover, an example of yet another method is a method in which a melted sheet (molten resin film) obtained by extruding the aforementioned produced pellets through a cylindrical die is converted to a film using the inflation method. With this method, a biaxially oriented inflation film is obtained.

The temperature setting for the extruder during production of a uniaxially oriented film varies depending on the monomer composition of the liquid crystal polymer, but is typically from 260 to 400° C., and is preferably from 300 to 380° C. If the film formation temperature is lower than 260° C., then either the film production speed slows, or the thickness precision deteriorates, meaning there is a possibility of an adverse effect on the productivity during the production of the prepreg described below. If the film formation temperature is higher than 400° C., then thermo-oxidative degradation is accelerated, and as a result, there is a possibility of a deterioration in the mechanical characteristics of the prepreg or the laminate thereof. In other words, provided the film formation temperature is at least 260° C., the film production speed increases, or the level of thickness precision improves, thus improving the productivity in the production of the prepreg described below. Provided the film formation temperature is not higher than 400° C., thermo-oxidative degradation is suppressed, resulting in improved mechanical characteristics for the prepreg or the laminate thereof.

The slit opening of the T-die is typically from 0.1 to 2 mm. Further, the draft ratio of the uniaxially oriented film is typically at least 1.1 but not more than 45. Here, the draft ratio refers to a value obtained by dividing the cross-sectional area of the T-die slit by the cross-sectional area of the film in a direction perpendicular to the longitudinal direction. Provided the draft ratio is at least 1.1, the film strength tends to increase. On the other hand, provided the draft ratio is not more than 45, the film tends to exhibit superior surface smoothness. The draft ratio can be adjusted by altering the setting conditions for the extruder, and the winding speed and the like.

Further, a biaxially oriented film can be produced by performing melt extrusion using the same extruder setting conditions as those used for the uniaxially oriented film. One example of the biaxial stretching method is a method in which the molten sheet extruded from the T-die is simultaneously stretched in the longitudinal direction and the direction perpendicular to the longitudinal direction (also called the transverse direction or TD). Further, another method is a sequential stretching method in which the molten sheet extruded from the T-die is first stretched in the longitudinal direction, and within the same production step, this stretched sheet is then stretched in the transverse direction using a tenter under high-temperature conditions of 100 to 400° C.

The stretching ratios for the biaxially stretched film are preferably from 1.1 to 20 times in the longitudinal direction, and from 1.1 to 20 times in the transverse direction. Provided the stretching ratios fall within the above ranges, the obtained film has excellent strength, and a film of uniform thickness can be more easily obtained.

Further, the temperature setting for the cylinder during production of an inflation film is typically from 260 to 400° C. and is preferably from 300 to 380° C. By performing melt-kneading of the liquid crystal polymer at a temperature setting within this range, and extruding a cylindrical liquid crystal polymer film from the annular slit of the extruder in either an upward or downward direction, an inflation film can be produced.

The annular slit opening is typically from 0.1 to 5 mm, and preferably from 0.2 to 2 mm. The annular slit diameter is typically from 20 to 1.000 mm, and preferably from 25 to 600 mm.

The melt-extruded cylindrical molten resin film is stretched by inflation in the longitudinal direction and the transverse direction. Specifically, the cylindrical molten resin film is drawn in the longitudinal direction, while air or an inert gas (for example, nitrogen gas) is blown into the inside of this molten resin film. At this time, the blow-up ratio (the ratio between the final tube diameter and the initial diameter) is typically from 1.5 to 10. Further, the stretching ratio in the MD direction is typically from 1.5 to 40. Provided the stretching ratio in the MD direction falls within this range, a liquid crystal polymer film having uniform thickness, few wrinkles and superior strength can be obtained.

The inflation-stretched film is air-cooled or water-cooled, and then drawn through nip rollers.

The MOR of the oriented liquid crystal polymer film of the present embodiment is greater than 1, and is preferably at least 1.1, more preferably at least 1.3, and even more preferably 2.0 or greater. Further, the molecular chain degree of orientation for the liquid crystal polymer film of the present embodiment is typically greater than 10%, and preferably 15% or greater.

The thickness of the oriented liquid crystal polymer of the present embodiment obtained in the manner described above may be selected in accordance with the performance required of the targeted prepreg, and there are no particular limitations. From the viewpoints of the film formability and the mechanical properties, the thickness of the liquid crystal polymer film is preferably from 0.5 to 500 μm, and from the viewpoint of the handling properties, is more preferably from 1 to 300 μm. The thickness of the liquid crystal polymer film can be determined by using a micrometer to measure the thickness of the oriented liquid crystal polymer film at five random locations, and then calculating the average of those measured values.

(Production of Base)

The base used in the production method of the present embodiment is produced, for example, using the method described below. First, the amount of sizing agent adhered to the carbon fiber bundle is reduced using the method described above, and the fiber bundle is then opened using an opening roller. Subsequently, the opened carbon fibers are placed in a conventional prepreg production device, and fed out in a single direction. In this manner, the base of the present embodiment can be obtained.

(Production of Prepreg)

In the present production method, the base that uses a continuous carbon fiber bundle as a forming material and the oriented liquid crystal polymer film are fed out in a superimposed arrangement, and are then subjected to heated melt-impregnation by passage through a heating furnace, thereby forming a prepreg impregnated with the oriented liquid crystal polymer. At this time, the oriented liquid crystal polymer film melts temporarily, but most of the orientation is maintained as the prepreg is formed. The molecular chain degree of orientation of the liquid crystal polymer contained in the prepreg can be confirmed by X-ray diffraction measurement.

If the direction of alignment of the continuous carbon fiber bundle (also called the longitudinal direction of the carbon fiber bundle) and the direction of orientation of the liquid crystal polymer are substantially the same, then when the prepreg is pulled in a direction parallel to the direction of alignment of the carbon fiber bundle (or the direction of orientation of the liquid crystal polymer), or folded in a direction that intersects this direction, the mechanical strength tends to increase further. Accordingly, if the case where the direction of alignment of the continuous carbon fiber bundle and the direction of orientation of the liquid crystal polymer are the same is deemed an angle of 0°, then this angle is preferably less than 90°, more preferably not more than 60°, even more preferably not more than 45°, still more preferably not more than 30°, and particularly preferably 10° or less.

<Prepreg Laminate>

The prepreg laminate of an embodiment of the present invention is produced by laminating a plurality of the prepregs described above. Specifically, by superimposing a prescribed number of prepregs produced in the manner described above, and then performing hot press molding, a laminate having a certain thickness can be obtained.

The molecular chain degree of orientation for the liquid crystal polymer contained in the prepreg laminate of the present embodiment is typically greater than 10%, and is preferably at least 20%, more preferably at least 30%, even more preferably at least 40%, still more preferably at least 50%, particularly preferably at least 60%, and most preferably 70% or greater.

In a separate aspect of the present invention, the molecular chain degree of orientation for the liquid crystal polymer contained in the prepreg laminate is typically greater than 10% but not more than 100%, and is preferably at least 20% but not more than 99%, more preferably at least 30% but not more than 95%, even more preferably at least 40% but not more than 95%, still more preferably at least 50% but not more than 90%, particularly preferably at least 60% but not more than 90%, and most preferably at least 70% but not more than 85%.

Examples of the pattern in which the prepregs are laminated include a method in which lamination is performed so that the directions of alignment of the carbon fibers are matched (0° C.), and a pattern in which the prepregs are laminated with an arbitrary offset in the angle. For example, when the angle is offset 45° for each prepreg, a configuration such as 0°/45°/90°/135°/180°/225°/270°/315°/360° (0°) is obtained. The arbitrary angle may be set appropriately in accordance with the intended application of the prepreg laminate.

Further, the volume fraction (Vf) of the continuous carbon fiber bundles relative to the total volume of the prepreg laminate of the present embodiment is typically at least 10% but not more than 85%, preferably at least 20% but not more than 75%, and more preferably at least 30% but not more than 65%. The volume fraction (Vf) of the continuous carbon fiber bundles relative to the total volume of the prepreg laminate can be measured using the same method as that described above for measuring the volume fraction (Vf) of the continuous carbon fiber bundle relative to the total volume of the aforementioned prepreg.

The prepreg laminate can be obtained by pressing a plurality of prepregs using a hot press device. The temperature during pressing is typically from 330 to 390° C., and is preferably from 340 to 390° C., and more preferably from 340 to 380° C.

The pressure during pressing is typically from 2 to 35 MPa, preferably from 3 to 30 MPa, and more preferably from 4 to 30 MPa.

By performing pressing at a temperature and pressure within the above ranges for a pressing time of 2 to 15 minutes, and then performing cooling for 5 to 20 minutes, a prepreg laminate can be obtained.

One aspect of the present invention is a prepreg of the present invention, wherein the basis weight is from 120 to 200 g/m², the dimension in the thickness direction is from 0.05 to 0.15 mm, and the molecular chain degree of orientation of the liquid crystal polymer is from 40 to 60%.

A separate aspect of the present invention is a prepreg which contains an oriented liquid crystal polymer and a base that uses a continuous carbon fiber bundle as a forming material, and has a 0° C. flexural strength of at least 1,400 (MPa), a 0° C. flexural modulus of at least 105 (GPa) and a 095° C. flexural strain of at least 1.50(%) measured in accordance with JIS K7017, as well as a prepreg laminate containing a plurality of these prepregs laminated together.

The 0° C. flexural strength mentioned above is preferably from 1,400 to 2,000 (MPa), more preferably from 1,500 to 2.000 (MPa), even more preferably from 1,800 to 2.000 (MPa), and particularly preferably from 1,850 to 2,000 MPa.

The 0° C. flexural modulus mentioned above is preferably from 95 to 110 (GPa), more preferably from 104 to 110 (GPa), and even more preferably from 108 to 110 (GPa).

The 0° C. flexural strain is preferably from 1.50 to 2.00(%), more preferably from 1.60 to 2.00(%), and even more preferably from 1.80 to 2.00(%).

The above embodiments of the present invention provide a prepreg and a prepreg laminate having excellent mechanical strength.

EXAMPLES

The present invention is described below in further detail using a series of examples and a comparative example, but the present invention is not limited to these examples.

<Measurement of Degree of Orientation MOR of Liquid Crystal Polymer Contained in Liquid Crystal Polymer Film>

The MOR of a liquid crystal polymer film (degree of orientation in drawing direction of film/degree of orientation in direction perpendicular to drawing direction and thickness direction) was measured using a molecular orientation analyzer MOA-5012A (manufactured by Oji Scientific Instruments Co., Ltd.). An MOR value greater than 1 means the liquid crystal polymer film is oriented in the drawing direction.

<Measurement of Molecular Chain Degree of Orientation of Liquid Crystal Polymer Contained in Liquid Crystal Polymer Film>

A wide-angle X-ray diffraction measurement was performed by installing an imaging plate in an X-ray small-angle scattering device. The device used was a NanoSTAR (device name, manufactured by Bruker AXS GmbH). Specifics of the measurement are described below.

For the X-rays, a rotating anode X-ray generator with a Cu target was used to generate X-rays at an output of 50 kV and 100 mA, and these X-rays were irradiated onto the liquid crystal polymer film. The X-rays were passed through an X-ray optical system composed of cross-coupled Goebel mirrors and three pinhole slits (wherein the hole diameters of the slits in order from the X-ray generator side were 500 µmø, 150 µmø, and 500 µmø) before contacting the liquid crystal polymer film. Upon contact with the liquid crystal polymer film, the X-rays that were scattered from the liquid crystal polymer film were detected using the imaging plate (IP), the camera length from the sample to the IP was 15 cm. The degree of vacuum inside the device was not more than 40 Pa.

<Measurement of Liquid Crystal Polymer Flow Starting Temperature>

Using a Flowtester CFT-500 (manufactured by Shimadzu Corporation), about 2 g of the liquid crystal polymer was packed in a cylinder fitted with a die having a nozzle with an inner diameter of 1 mm and a length of 10 mm, the liquid crystal polymer was melted by raising the temperature at a rate of 4° C./minute under a load of 9.8 MPa (100 kg/cm), the melted polymer was then extruded from the nozzle, and the temperature at which a viscosity of 4,800 Pa-s (48,000 poise) was obtained was measured.

<Matrix Resins (A)>

A liquid crystal polymer film (A-1) and a polyamide film (A-2) that were used as the matrix resin (A) are described below.

[Liquid crystal polymer film (A-1)]
(Production of Liquid Crystal Polymer)

A reactor fitted with a stirrer, a torque meter, a nitrogen gas inlet, a thermometer and a reflux condenser was charged with 1,034.99 g (5.5 mol) of 6-hydroxy-2-naphthoic acid, 378.33 g (1.75 mol) of 2,6-naphthalenedicarboxylic acid, 83.07 g (0.5 mol) of terephthalic acid, 272.52 g (2.475 mol, a 0.225 molar excess relative to the total number of moles of the 2,6-naphthalenedicarboxylic acid and the terephthalic acid) of hydroquinone and 1,226.87 g (12 mol) of acetic anhydride, and 0.17 g of 1-methylimidazole was then added as a catalyst. Subsequently, the gas inside the reactor was substituted with nitrogen gas, and with the contents undergoing constant stirring under a stream of nitrogen gas, the temperature was raised from room temperature to 145° C. over a period of 15 minutes, and the mixture was then refluxed at 145° C. for one hour. The temperature was then raised from 145° C. to 310° C. over a period of 3 hours and 30 minutes while any by-product acetic acid and unreacted acetic anhydride were removed.

After holding the temperature at 310° C. for 3 hours, the contents were removed and cooled to room temperature. The thus obtained solid product was ground to a particle size of about 0.1 to 1 mm using a grinder. A solid-phase polymerization was then performed by heating the ground solid product under a nitrogen atmosphere, from room temperature to 250° C. over a period of one hour, subsequently from 250° C. to 310° C. over a period of 10 hours, and then holding the temperature at 310'C for 5 hours. The product obtained following this solid-phase polymerization was then cooled to obtain a powdered liquid crystal polymer.

This liquid crystal polymer had a repeating unit (1) in which $Ar^1$ was a 2,6-naphthylene group in an amount of 55 mol % relative to the total number of moles of all the repeating units. Further, the liquid crystal polymer had 17.5 mol % of a repeating unit (2) in which $Ar^2$ was a 2,6-naphthylene group. Furthermore, the liquid crystal polymer had 5 mol % of a repeating unit (2) in which $Ar^2$ was a 1,4-phenylene group. Moreover, the liquid crystal polymer also had 22.5% of a repeating unit (3) in which $Ar^3$ was a 1,4-phenylene group and X and Y were both oxygen atoms.

The flow starting temperature of the obtained liquid crystal polymer was 333° C.

(Liquid Crystal Polymer Film Formation)

The powdered liquid crystal polymer was granulated and pelletized using a twin-screw extruder PCM-30 (manufactured by Ikegai, Ltd.). Subsequently, the pelletized liquid crystal polymer was supplied to a single-screw extruder (screw diameter: 50 mm), melted, and extruded in a film-like form from a T-die (lip length: 300 mm, lip clearance: 1 mm, die temperature: 350° C.) and then cooled, thus obtaining a liquid crystal polymer film (A-1) having a width of 520 mm and a thickness of 25 μm.

Measurement of the MOR of the obtained liquid crystal polymer film (A-1) revealed a value of 2.25, confirming orientation in the drawing direction.

Measurement of the molecular chain degree of orientation for the liquid crystal polymer film (A-1) revealed a value of 17%.

[Polyamide Film (A-2)]

A polyamide 6 film ON-25 (manufactured by Unitika Ltd.) with a thickness of 25 μm was prepared and used as a polyamide film (A-2).

[Liquid Crystal Polymer Film (A-3)]

Using the same liquid crystal polymer as Example 1, but with the exception of reducing the winding speed from the single-screw extruder, the same film formation method as Example 1 was used to obtain a liquid crystal polymer film (A-3).

Measurement of the MOR of the obtained liquid crystal polymer film (A-3) revealed a value of 1.35, confirming orientation in the drawing direction.

In the liquid crystal polymer film (A-3), by reducing the winding speed from the extruder compared with the liquid crystal polymer film (A-1), a film of lower MOR was obtained.

<Bases (B)>
[Base (B-1)]

A carbon fiber bundle was immersed in an acetone bath to reduce the amount of sizing agent. Following this reduction, the fiber bundle was opened using a vibrating device MH001 (manufactured by Maruhachi Corporation). The opened carbon fibers were placed in a prepreg sheet production device MH002 (manufactured by Maruhachi Corporation), and unidirectionally aligned continuous fibers spanning a width of about 240 mm were used as a base (B-1).

The carbon fiber roving (carbon fiber bundle) used for the base (B-1) employed the following material.

Carbon fiber roving: manufactured by Toho Tenax Co., Ltd., brand name: HITS-40, fineness: 800 TEX, number of filaments: 12,000, contains adhered epoxy sizing agent, tensile strength: 4,400 MPa, tensile modulus of elasticity: 240 CPa, degree of elongation: 1.8%, density: 1.77 $g/cm^3$

[Base (B-2)]

A carbon fiber bundle was immersed in an acetone bath to reduce the amount of sizing agent. Following this reduction, the fiber bundle was opened using a vibrating device MH001 (manufactured by Maruhachi Corporation). The opened carbon fibers were placed in a prepreg sheet production device MH002 (manufactured by Maruhachi Corporation), and unidirectionally aligned continuous fibers spanning a width of about 500 mm were used as a base (B-2).

The carbon fiber roving (carbon fiber bundle) used for the base (B-2) employed the following material.

Carbon fiber roving: manufactured by Mitsubishi Rayon Co., Ltd., brand name: TR 50S 15L fineness: 1,050 TEX, number of filaments: 15,000, contains adhered epoxy sizing agent, tensile strength: 4,900 MPa, tensile modulus of elasticity: 240 GPa, degree of elongation: 2.0%, density: 1.82 $g/cm^2$ <Prepreg Laminates>

Example 1

A sheet of the liquid crystal polymer film (A-1) that had been cut to a width of about 240 mm was superimposed on each of the two surfaces of the base (B-1), and lamination was performed so that the direction of orientation of the liquid crystal polymer and the direction of alignment of the base matched. This laminate was fed continuously into the heated furnace of the prepreg sheet production device mentioned above, and by melting the liquid crystal polymer films by heating at 300° C., and melt-impregnating the base with the liquid crystal polymer, a prepreg was obtained. The basis weight of the obtained prepreg was 156 $g/m^2$, and the thickness was 0.1 mm. Measurement of the molecular chain degree of orientation for the liquid crystal polymer contained in the prepreg using the same method as that described for the liquid crystal polymer film (A-1) yielded a result of 48%.

The obtained prepreg was molded into a sheet of 140 mm×140 mm, and 26 of these sheets were laminated along the 0° direction. The resulting laminate was subjected to press molding using a hot press device (manufactured by GO-factory Co., Ltd.) under molding conditions including a press temperature of 380° C., a press pressure of 30 MPa, a press time of 2 minutes and a cooling time of 6 minutes. This process yielded a prepreg laminate of Example 1, having a size of 140 mm×140 mm×2 mm. The volume fraction of the carbon fiber bundles in the prepreg laminate of Example 1 was 49%. Further, measurement of the molecular chain degree of orientation for the liquid crystal polymer contained in the prepreg laminate using the same method as that described for the liquid crystal polymer film (A-1) yielded a result of 79%. The amounts of the liquid crystal polymer film (A-1) and the base (B-1) in the prepreg laminate of Example 1 are shown in Table 1.

Example 2

With the exception of using the liquid crystal polymer film (A-3), a prepreg was obtained using the same method as Example 1. The basis weight of the obtained prepreg was 157 g/m², and the thickness was 0.99 mm.

With the exceptions of changing the press temperature to 340° C. and the press pressure to 4 MPa, a prepreg laminate of Example 2 having a thickness of 2 mm was obtained using the same method as Example 1. The volume fraction of the carbon fiber bundles in the prepreg laminate of Example 2 was 49%. The amounts of the liquid crystal polymer film (A-3) and the base (B-1) in the prepreg laminate of Example 2 are shown in Table 1.

Example 3

With the exception of using the liquid crystal polymer film (A-3), a prepreg was obtained using the same method as Example 1.

With the exceptions of changing the press temperature to 340° C., the press pressure to 4 MPa and the press time to 6 minutes, a prepreg laminate of Example 3 was obtained using the same method as Example 1. The amounts of the liquid crystal polymer film (A-3) and the base (B-1) in the prepreg laminate of Example 3 are shown in Table 1.

Comparative Example 1

A sheet of the polyamide film (A-2) that had been cut to a width of about 500 mm was superimposed on each of the two surfaces of the base (B-2), and lamination was performed so that the direction of orientation of the polyamide films and the direction of alignment of the base matched. This laminate was fed continuously into the heated furnace of the prepreg sheet production device mentioned above, and a prepreg was obtained by melt-impregnating the base with the polyamide.

The obtained prepreg was molded into a sheet of 500 mm×500 mm, and 13 of these sheets were laminated along the 0° direction. The resulting laminate was subjected to press molding using a hot press device (manufactured by GO-factory Co., Ltd.) under molding conditions including a press temperature of 280° C., a press pressure of 30 MPa, a press time of 2 minutes and a cooling time of 6 minutes. This process yielded a prepreg laminate of Comparative Example 1, having a size of 500 mm×500 mm×2 mm. The volume fraction of the carbon fiber bundles in the prepreg laminate of Comparative Example 1 was 52%. Further, the amounts of the polyamide film (A-2) and the base (B-2) in the prepreg laminate of Comparative Example 1 are shown in Table 1.

TABLE 1

| Material | | Example 1 | Example 2 | Example 3 | Comparative Example 1 |
|---|---|---|---|---|---|
| Matrix resin (A) | Liquid crystal polymer film (A-1) | 100 parts by mass | — | — | — |
| | Polyamide film (A-2) | — | — | — | 100 parts by mass |
| | Liquid crystal polymer film (A-3) | — | 100 parts by mass | 100 parts by mass | — |
| Base (B) | (B-1) | 124 parts by mass | 124 parts by mass | 124 parts by mass | — |
| | (B-2) | — | — | — | 170 parts by mass |

<Evaluation of Mechanical Strength of Prepreg Laminates>

Evaluation of the mechanical strength of the prepreg laminates from Examples 1 to 3 and Comparative Example 1 was performed by comparing the fracture energy of the prepreg laminates. Specifically, each of the prepreg laminates from Examples 1 to 3 and Comparative Example 1 was subjected to a 0° flexural test in accordance with JIS K7017, and the 0° flexural strength, the 0° flexural modulus, and the 0° flexural strain were measured. Each measurement was performed three times, with the average value being used, and the value obtained by integrating the flexural stress until the rupture point by the amount of flexural strain was recorded as the fracture energy. The results of evaluating the mechanical strength of the prepreg laminates from the examples and the comparative example are shown in Table 2. The 0° flexural test was performed under the following conditions.

[Test conditions]
  Device: Tensilon Universal Testing Instrument, manufactured by A&D Co., Ltd.
  Test speed: 2 mm/minute
  Distance between fulcrums: 80 mm
  Distance between fulcrums/test piece thickness=40
  Test repetitions: 3
  Bending direction: thickness direction

TABLE 2

| | | Example 1 | Example 2 | Example 3 | Comparative Example 1 |
|---|---|---|---|---|---|
| Composition of prepreg laminate | Matrix resin (A) | (A-1) | (A-3) | (A-3) | (A-2) |
| | Base (B) | (B-1) | (B-1) | (B-1) | (B-2) |
| Evaluation of mechanical strength at prepreg laminate | 0° flexural strength (MPa) | 1890 | 1407 | 1533 | 1500 |
| | 0° flexural modulus (GPa) | 109 | 99 | 105 | 104 |
| | 0° flexural strain (%) | 1.82 | 1.53 | 1.62 | 1.58 |
| | Fracture energy (MPa) | 8020 | 4529 | 5493 | 3910 |

It was evident that the prepreg laminates of Examples 1 to 3 exhibited a much higher value for the fracture energy when compared with the prepreg laminate of Comparative Example 1 which used a conventional thermoplastic resin as the matrix. Further, as shown in Table 2, the prepreg laminate of Example 1 exhibited superior toughness to the prepreg laminate of Comparative Example 1. In this manner, it was evident that the prepreg laminate of the present invention exhibited excellent mechanical strength.

The above results confirmed that the present invention is very useful.

INDUSTRIAL APPLICABILITY

The present invention provides a prepreg and a prepreg laminate which have excellent mechanical strength. Further the invention also provides a method for producing the prepreg having excellent mechanical strength.

Accordingly, the present invention is extremely useful industrially.

The invention claimed is:

1. A prepreg comprising an oriented liquid crystal polymer, and a base that uses a continuous carbon fiber bundle as a forming material, wherein the oriented liquid crystal polymer is impregnated into the base, and wherein a molecular chain degree of orientation of the oriented liquid crystal polymer is at least 20%.

2. The prepreg according to claim 1, wherein the liquid crystal polymer is a thermotropic liquid crystal polymer.

3. The prepreg according to claim 1, comprising the base in an amount of at least 25 parts by mass but not more than 550 parts by mass per 100 parts by mass of the liquid crystal polymer.

4. A prepreg laminate prepared by laminating a plurality of the prepreg according to claim 1.

5. A method for producing the prepreg according to claim 1, the method comprising a step of superimposing a film that uses an oriented liquid crystal polymer as a forming material, and a base that uses a continuous carbon fiber bundle as a forming material, and subsequently performing heating, thereby melt-impregnating the liquid crystal polymer into the base.

6. The prepreg according to claim 1, wherein a proportion of carbon fibers extending continuously from one end of the base to the other end of the base without a break is 50% by mass to 100% by mass with respect to a total mass of the continuous carbon fiber bundle.

* * * * *